Patented Apr. 7, 1936

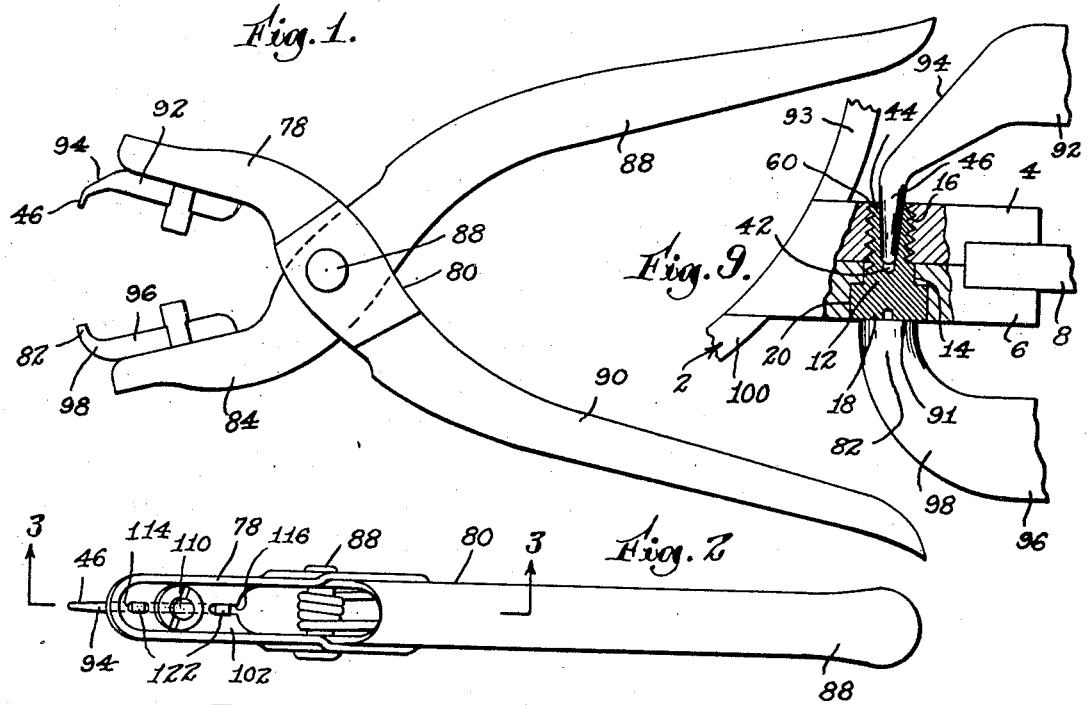
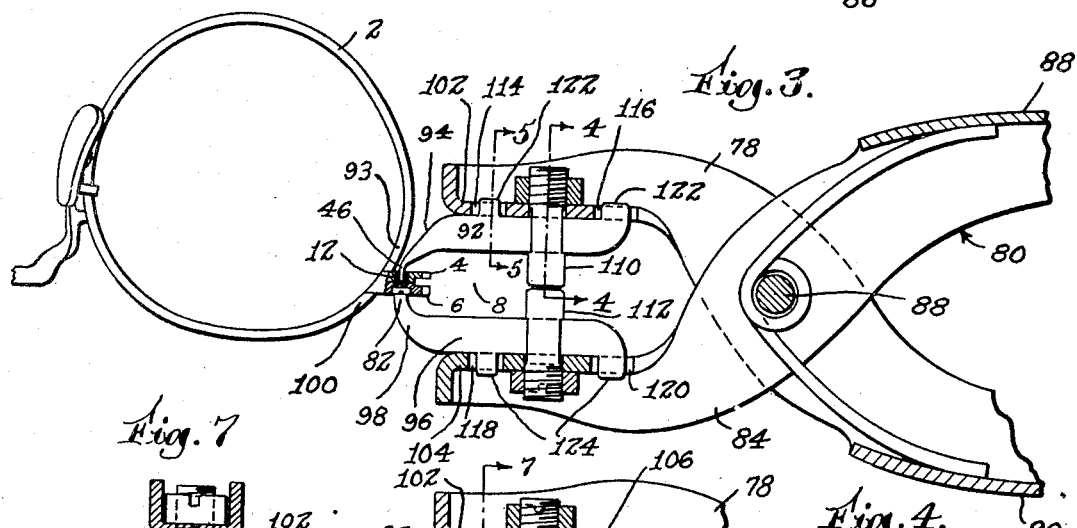
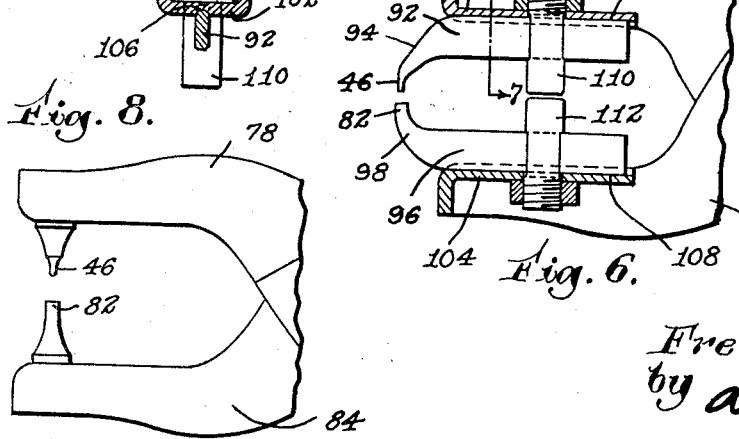
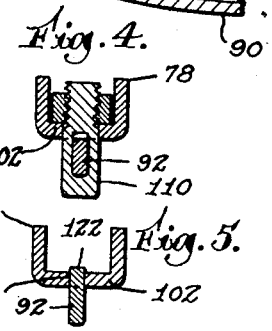

2,036,553

UNITED STATES PATENT OFFICE 2,036,553

TOOL FOR SECURING SMALL METAL SCREWS IN THREADED POSITION

Frederick A. Stevens, Providence, R. I.

Application August 10, 1934, Serial No. 739,290

3 Claims. (Cl. 81—3.6)

The present invention relates to tools, and more particularly to tools for securing small metal screws in threaded position.

Parts of ophthalmic mountings, and other devices that are similarly held together, have a tendency to separate, because the screws do not hold tight. According to the inventions disclosed in applications Serial No. 683,323, filed August 2, 1933, Serial No. 722,092, filed April 24, 1934, and Serial No. 732,786, filed June 28, 1934, minute, threaded, light, metal parts, having very few threads, such as is the case with the screws and dowels used in the manufacture and maintenance of ophthalmic mountings and similar articles, are assembled and locked in position in a very effective manner.

A chief object of the invention is to provide a novel tool for producing a uniform locking effect for screws and the like of the above-described character.

Other and further objects of the invention will be explained hereinafter, and will be more particularly pointed out in the appended claims.

The invention will be described in connection with the accompanying drawing, in which Fig. 1 is an elevation of a novel tool embodying the present invention in its preferred form; Fig. 2 is a corresponding plan; Fig. 3 is an enlarged section, taken upon the line 3—3 of Fig. 2, looking in the direction of the arrows, and showing the tool in use; Figs. 4 and 5 are sections taken upon the lines 4—4 and 5—5, respectively, of Fig. 3, looking in the direction of the arrows; Fig. 6 is a view similar to Fig. 3, of a modification; Fig. 7 is a section taken upon the line 7—7 of Fig. 6, looking in the direction of the arrows; Fig. 8 is a view of a further modification; and Fig. 9 is an enlarged section illustrating the action of the tool upon the screw, as illustrated upon a smaller scale in Fig. 3.

Errors of human vision may be corrected by properly prescribed lenses, mounted in fittings, mostly of metal, and held together by very small screws. One of these fittings is shown as a lens-holding, metal rim 2 of a pair of spectacles, having metal end pieces 4 and 6 between which swings a temple 8 upon a dowel (not shown). The end pieces 4 and 6 are usually held together by one of the said very small screws, shown as an externally threaded, cylindrical, metal screw 12 disposed loosely in a cylindrical opening 14 of the end piece 6 and threaded into an internally threaded, cylindrical opening 16 in the end piece 4. The head 18 of the screw 12 is seated in a countersink 20 of the end piece 6.

These fittings must be adjusted accurately to conform to the facial and visual requirements of each case; and when once fitted, it is highly important that the lenses shall remain in the prescribed positions. As the screws 12 have a tendency to loosen, particularly because of the strains encountered by flexing the temples and wiping the glasses, vibrations due to walking and the like, it is impossible to obtain this desired result; for to maintain the lenses in the prescribed position, it is necessary that the screws 12 shall continue to hold the assembled parts firmly together, without loosening.

These screws 12 have very short, threaded portions; say, about four or five threads long, or about ninety to the inch. The depth of the hereinafter mentioned aperture 42 is in the neighborhood of thirty thousandths of an inch. The diameter of these screws is only about forty five thousandths of an inch, so that the diameter of the aperture 42 may be about twenty thousandths of an inch.

The minute size of the screws 12 used in these ophthalmic mountings is an important factor to be considered. The smallness of the screw diameter, the shortness of the threaded portion, and the speed at which the screws 12 are produced, resulting in variations from cylindrical shape, as hereinafter explained, all play their role in reducing the permanency of the holding power that may be expected of these minute, threaded members. While the defects are of such a nature as to be visible only under magnification, so that it becomes necessary, for illustrative purposes, to exaggerate the drawing, they are nevertheless the prime causes of the said loosening.

According to the inventions disclosed in the above-designated applications, the difficulties attendant upon such loosened screws are overcome by providing the screw 12, at its threaded end, with a preferably cylindrical aperture 42 that extends centrally along, or parallel to, the axis, or longitudinally of the screw 12. A continuous, annular, exteriorly threaded wall 44 is thus formed about the aperture 42. Preferably, the length of the aperture 42 is about the same as the length along which the screw threads extend, and the aperture is located in the neighborhood of these screw threads, as shown.

The operation is exceedingly simple and most effective. With the parts assembled, and the threaded members threaded together, as shown, for example, in Fig. 3, a jaw 82 is positioned against the head 18 of the screw 12, and the swaging mandrel 46 is now driven into the aperture 42. A force is thus exerted against the annular wall 44 of the aperture 42, toward the supporting jaw 82, resulting in expanding the continuous, annular wall 44 preferably in all directions radially outward from the axis of the screw 12, but without breaking the continuity of the annular wall 44. The annular wall 44 thus becomes swaged into tight engagement with the wall of the threaded, cylindrical opening 16 to cause the exterior threads of the screw 12, throughout substantially the said length along which the screw threads extend, to lock frictionally against the interior threads of the opening 16. As the continuity of the annular wall is not broken, the external threads of the annular wall remain in tight, frictional engagement with the internal threads of the walls of the opening 16, by reason of the inherent resiliency of the metal of which the screw 12 is made, without splitting the annular wall and without relying upon outside, supplementary holding-member aids, such as a locking plug, to hold the annular wall in place. The mandrel 46 may be withdrawn and the aperture 42 left entirely empty, yet a very effective, non-loosening joint is thus provided, that requires considerable force to produce the integral, circular expansion, and that resists compression and consequent loosening to a remarkable degree.

The mandrel may be circular in cross section, as described in the said application, Serial No. 722,092; or oval, or triangular, or square, or it may have any other irregular shape, as described in the said application Serial No. 732,786. In all cases, however, the free end of the mandrel is of cross section small enough to permit the mandrel to enter the aperture 42, but the body of the mandrel is large enough to enable the mandrel, during its entry into the aperture 42, to effect the radial expansion before described, without breaking the continuity of the annular wall 44.

The screws 12 and the like that are employed in ophthalmic mountings are of such very small dimension, as indicated above, that they present very weak resistive forces to the action of the tools that cut the threads thereon. The resistive force is particularly weak at the extreme, free end 60 of the screw 12, and increases with the distance from the said free end 60 inward toward the screw head 18. The said thread-cutting tools consequently act to reduce the diameter of the screw 12 more at the said free end 60 than along the body thereof, producing a more or less tapering effect in these members near the free end 60. This reduction in diameter near the free end 60 is particularly noticeable at the tops of the threads.

If the mandrel 46 were cylindrical, therefore, and if the apertures 42 were also cylindrical, the mandrel would expand the thread convolutions near the said free end 60 against the threaded wall of the opening 16 with less pressure than the remaining thread convolutions. Not only that, but the degree of pressure with which the said thread convolutions near the said free end 60 bear upon the wall of the opening 16 would be successively less and less in the direction toward the free end 60 of the screw 12. If the screw 12 were of substantial length, this would not be serious, for the remaining thread convolutions could be relied upon to hold the parts effectively together. Such considerations do not apply, however, where the screw-thread convolutions are so few in number that every thread convolution must be relied upon to carry its share of the holding power required to hold the parts together.

One reason why ophthalmic-mounting screws loosen so frequently, in fact, is because, the screws being so short, so few of the already few threads, owing to the said unavoidable taper, exert any real binding engagement against the cooperating internal threads into which they are threaded.

Provision is accordingly made for compensating for this variation in the diameter of the screw-threaded member 12 by producing a greater degree of expansion near the free end 60 of the screw 12 than at other points, and for gradually decreasing the degree of expansion in a direction from the said free end 60 toward the head 18 of the screw 12. This compensating effect is produced by using a tapering mandrel 46, the small end of the taper being at the free end of the mandrel, as illustrated. When a mandrel of this shape is driven home, as illustrated in Figs. 3 and 9, the thread convolutions of the screw 12 will all be expanded against the wall of the threaded opening 16 so as to bear thereagainst with approximately uniform holding action. If anything, indeed, the holding action of the thread convolutions near the free end 60 of the screw 12 will be greater than that of the threads farther away. The use of a tapered mandrel 46, furthermore, makes it possible to employ a shorter aperture 42 than would be required with a cylindrical mandrel; but cylindrical mandrels may also be embodied in the tool of the present invention.

The depth and diameter of the aperture 42 should be such as will produce the desired radial expansion for the particular purpose in hand. The threaded, metal, annular wall 44 must possess strength and flexibility to withstand the expanding operation without fracture. The flexibility must be of such a nature as to allow, in case of need, as to replace a broken lens, withdrawal of the screw 12 intact, a reinsertion of the same screw 12 or another screw 12, and a relocking, if desired; for the locking of the screw does not injure either the screw 12 itself, or the parts in which it is locked. The manner of application and control of this internal-expansion principle, as applied to varying shapes, sizes and conditions, and by the progressive use of the said tool, has resulted in a locking achievement not heretofore produced.

The compensating mandrel 46, intended for the entrance and expansion of the aperture 42, may be mounted on one jaw 78 of a hand tool 80; and the cooperating supporting anvil 82 for the head 18 of the screw on the other jaw 84, the mandrel 46 and the anvil 82 being in alinement when the tool is effective, as illustrated in Figs. 3 and 9. The head 18 of the screw 12 is engaged by the anvil 82, as before described, and the mandrel 46 is driven home into the aperture 42 by progressively pivoting the jaws 78 and 84 toward each other, about a pivot 88. The degree of compressive drive of the mandrel 46 may be controlled by pivoting the jaws 78 and 84 towards each other to a greater or less degree, as desired. A reverse movement of the handles 88 and 90 of the tool will effect withdrawal of the mandrel 46.

By varying the degree of pressure applied by the hand to the handles 88 and 90 of the hand tool 80, when a tapering mandrel is employed, or by varying the diameter of a cylindrical mandrel, it is possible to obtain practically any desired degree of uniform, frictional engagement, depending upon the use to which the joint is to be put. The more nearly cylindrical the screw-threaded member 12 is, the less will be the range of expansion of the wall 44 that may be required.

The contacting end of the supporting anvil 82 is shown slightly smaller in diameter than the diameter of the screw head 18 against which it functions. This ensures that the head 18 shall, at all times, contact with the anvil 82 when the mandrel 46 is engaged in its expansion of the walls of the aperture 42. The double contact thus produced at opposite ends of the screw 12 ensures a completely controlled, radial expansion. To obtain such a controlled, even, radial expansion, it is desirable that the pressure should be applied to both ends of the screw 12 at one and the same time, else there might be an endwise crowding of the screw against the threads of the opening 16, instead of the desired expansion.

If, for example, the countersink 20 were deeper than the thickness of the screw head 18, and if the diameter of the anvil 82 were greater than that of the screw head 18, there would then be a vacancy between them, or a gap, at the point marked 91 in Fig. 9. The downward drive of the mandrel 46, against the walls of the aperture 42, might then, owing to the small dimensions above described, result in the screw 12 being forced downward to fill this vacancy or gap. Instead of the desired, controlled expansion, there might be an uncontrolled upsetting action of the threads.

An effective lock is thus provided against accidental loosening of the screw-threaded members, both ends of which are exposed to view, and without disfiguring the final product, for an article, like an ophthalmic mounting, that is worn on the face, must have an attractive appearance.

In Figs. 3 and 9, the end pieces 4 and 6 are shown attached to the split lens rim 2 at a point above the center of the rim. When using the tool of the present invention to lock the screw 12 in position, the rim will be held upside down, as illustrated. The tool is so designed as to permit clear vision of the aperture 42 in the screw 12, in order that the mandrel 46 may be inserted accurately into the aperture 42 without difficulty before the expanding pressure is applied. If the jaw 78 were shaped as in Fig. 8, therefore, it would not serve so well for the type of lens rim illustrated in Figs. 3 and 9, having a portion 93 of the rim arching over the end piece 4.

According to the preferred embodiment of the present invention, therefore, the mandrel 46 is mounted upon a support 92 that is offset from the mandrel 46, and that inclines somewhat sharply toward the mandrel 46, providing an inclined face 94 adapted to be positioned adjacent to the said overarching portion 93 of the lens rim, so as not to interfere with the said over-arching portion 93 of the rim. The relative dimensions and angle of incline are very important; for unless the inclined face 94 is exactly the right distance from the mandrel 46, it will not be possible conveniently to locate the mandrel 46 in the aperture 42, as before described. The governing factor is the angle of the over-arching portion 93 of the lens rim 2.

The anvil 82 is similarly mounted upon a support 96 that is likewise provided with an inclined portion 98 between the body portion of the support 96 and the anvil 82, but the angle of incline of the inclined portion 98 need not be so carefully selected, as the portion 100 of the lens rim that is adjacent to the end piece 6 leaves the said end piece 6 at a widely obtuse angle.

The supports 92 and 96 are shown constituted of plate or sheet metal, so as to withstand the necessary strains without springing. The planes of the plate or sheet are substantially at right angles to the oppositely disposed faces 102 and 104 of the jaws 78 and 84 upon which they are supported. The faces 102 and 104 may be provided with longitudinally disposed grooves 106 and 108 in which the supports 92 and 96 are adapted to rest. They may be held in position in the grooves 106 and 108 by studs 110 and 112. The studs may be round bolts, as shown.

The grooves 106 and 108 may extend throughout the length of the jaws, as shown in Fig. 6, or they may consist of separated openings or perforations 114, 116, 118 and 120 for receiving projections 122 and 124 upon the respective plates 92 and 96.

It will be understood that the dimensions above given are for illustrative purposes, and that, in any particular case, they may be varied to suit such particular case.

The tool of the present invention may, of course, be used elsewhere than in ophthalmic mountings, and for other purposes than to hold the end pieces 4 and 6 together.

Further modifications will occur to persons skilled in the art, and all such are intended to be included within the scope of the appended claims.

What is claimed is:

1. An expanding tool for use with a relatively small-dimensioned light, substantially cylindrical metal screw adapted to be threaded into a threaded opening of a part of an ophthalmic mounting of relatively light material, and the screw having an aperture extending substantially parallel to the axis of the cylinder from its free end inward toward the head of the screw for a distance substantially equal to the length of the threaded opening so as to form a continuous, annular, exteriorly threaded wall throughout substantially the said length, the tool comprising two cooperating jaws, a swaging mandrel carried by one of the jaws, the free end of the mandrel having a cross section small enough to permit the mandrel to enter the aperture, but the body of the mandrel being large enough to enable the mandrel, during its said entry into the aperture, to swage the continuous, annular wall by expansion, without breaking the continuity of the annular wall, into tight engagement with the wall of the threaded opening, throughout a distance substantially equal to the said length, the material and the dimensions of the screw being such as to cause the exterior threads upon the annular wall to lock frictionally against the threads of the threaded opening throughout substantially the said length by the inherent resiliency of the swaged metal of the screw without the aid of a locking plug permanently positioned in the aperture, and an anvil carried by the other jaw for supporting the head of the screw during the said entry of the mandrel into the aperture.

2. An expanding tool for use with a split, ophthalmic-mounting, lens rim having end pieces of relatively light material at a point above the center of the rim, whereby a portion of the rim arches over one of the end pieces, the end pieces being adapted to be connected together by a relatively small-dimensioned, light, substantially cylindrical, metal screw threaded into a threaded opening in one of the end pieces, and the screw having an aperture extending substantially parallel to the axis of the cylinder from its free end inward toward the head of the screw for a distance substantially equal to the length of the threaded opening so as to form a continuous, annular, exteriorly threaded wall throughout substantially the said length, the tool comprising two cooperating jaws, one of the jaws having a support and a portion extending outward therefrom at a sharp incline so as to be bent away from the support, whereby the said sharply inclined portion is adapted to be disposed adjacent to the said overarching portion of the lens rim, a swaging mandrel carried by the said sharply inclined, bent-away portion, the free end of the mandrel having a cross section small enough to permit the mandrel to enter the aperture, but the body of the mandrel being large enough to enable the mandrel, during its said entry into the aperture, to swage the continuous, annular wall by expansion, without breaking the continuity of the annular wall, into tight engagement with the wall of the threaded opening, throughout a distance substantially equal to the said length, the material and the dimensions of the screw being such as to cause the exterior threads upon the annular wall to lock frictionally against the threads of the threaded opening throughout substantially the said length by the inherent resiliency of the swaged metal of the screw without the aid of a locking plug permanently positioned in the aperture, and an anvil carried by the other jaw for supporting the head of the screw during the said entry of the mandrel into the aperture.

3. An expanding tool for use with a relatively small-dimensioned, light, substantially cylindrical, metal screw adapted to be threaded into a threaded opening of a part of an ophthalmic mounting of relatively light material, and the screw having an aperture extending substantially parallel to the axis of the cylinder from its free end inward toward the head of the screw for a distance substantially equal to the length of the threaded opening so as to form a continuous, annular, exteriorly threaded wall throughout substantially the said length, the tool comprising two cooperating jaws, a plate support carried by each jaw, a swaging mandrel upon one of the supports, the free end of the mandrel having a cross section small enough to permit the mandrel to enter the aperture, but the body of the mandrel being large enough to enable the mandrel during its said entry into the aperture, to swage the continuous, annular wall by expansion, without breaking the continuity of the annular wall, into tight engagement with the wall of the threaded opening, throughout a distance substantially equal to the said length, the material and the dimensions of the screw being such as to cause the exterior threads upon the annular wall to lock frictionally against the threads of the threaded opening throughout substantially the said length by the inherent resiliency of the swaged metal of the screw without the aid of a locking plug permanently positioned in the aperture, and an anvil upon the other support for supporting the head of the screw during the said entry of the mandrel into the aperture.

FREDERICK A. STEVENS.